(12) United States Patent  (10) Patent No.: US 7,414,698 B2
Cashin et al.  (45) Date of Patent: Aug. 19, 2008

(54) CAPTIONING SYSTEM AND METHOD

(76) Inventors: James Cashin, 181 Bonetti Dr., San Luis Obispo, CA (US) 93401; Earl Roger Hibbard, 177 Pearwood, San Luis Obispo, CA (US) 93420

( * ) Notice: Subject to any disclaimer, the term of this patent is extended or adjusted under 35 U.S.C. 154(b) by 0 days.

(21) Appl. No.: 11/375,955

(22) Filed: Mar. 15, 2006

(65) Prior Publication Data

US 2007/0216868 A1  Sep. 20, 2007

(51) Int. Cl.
*G03B 21/32* (2006.01)
(52) U.S. Cl. .......................... 352/90; 352/85
(58) Field of Classification Search .................. 352/40, 352/85, 90; 348/465, 563, 725; 345/7, 9
See application file for complete search history.

(56) References Cited

U.S. PATENT DOCUMENTS

| 4,673,266 A | 6/1987 | Fiumi |
| 4,859,994 A * | 8/1989 | Zola et al. ...................... 345/9 |
| 5,570,944 A | 11/1996 | Seder et al. |
| 5,648,789 A | 7/1997 | Beadles et al. |
| 6,005,536 A | 12/1999 | Beadles et al. |
| 6,741,323 B2 * | 5/2004 | Plunkett ...................... 352/90 |
| 6,785,539 B2 | 8/2004 | Hale |
| 2004/0032379 A1* | 2/2004 | Price et al. ..................... 345/7 |

* cited by examiner

*Primary Examiner*—Rodney E Fuller
(74) *Attorney, Agent, or Firm*—Andra M. Vaccaro

(57) ABSTRACT

A system for providing closed-caption text in a movie theater wherein the caption information is only visible to those patrons wishing to view the text, comprising a projector projecting a plurality of light applications onto a predetermined strip of light in a viewing area, encoding the caption text so that it will only be viewed within the predetermined strip of light in the viewing area and decoding the encoded text so that it will be viewed only by those patrons wishing to view the text.

6 Claims, 4 Drawing Sheets

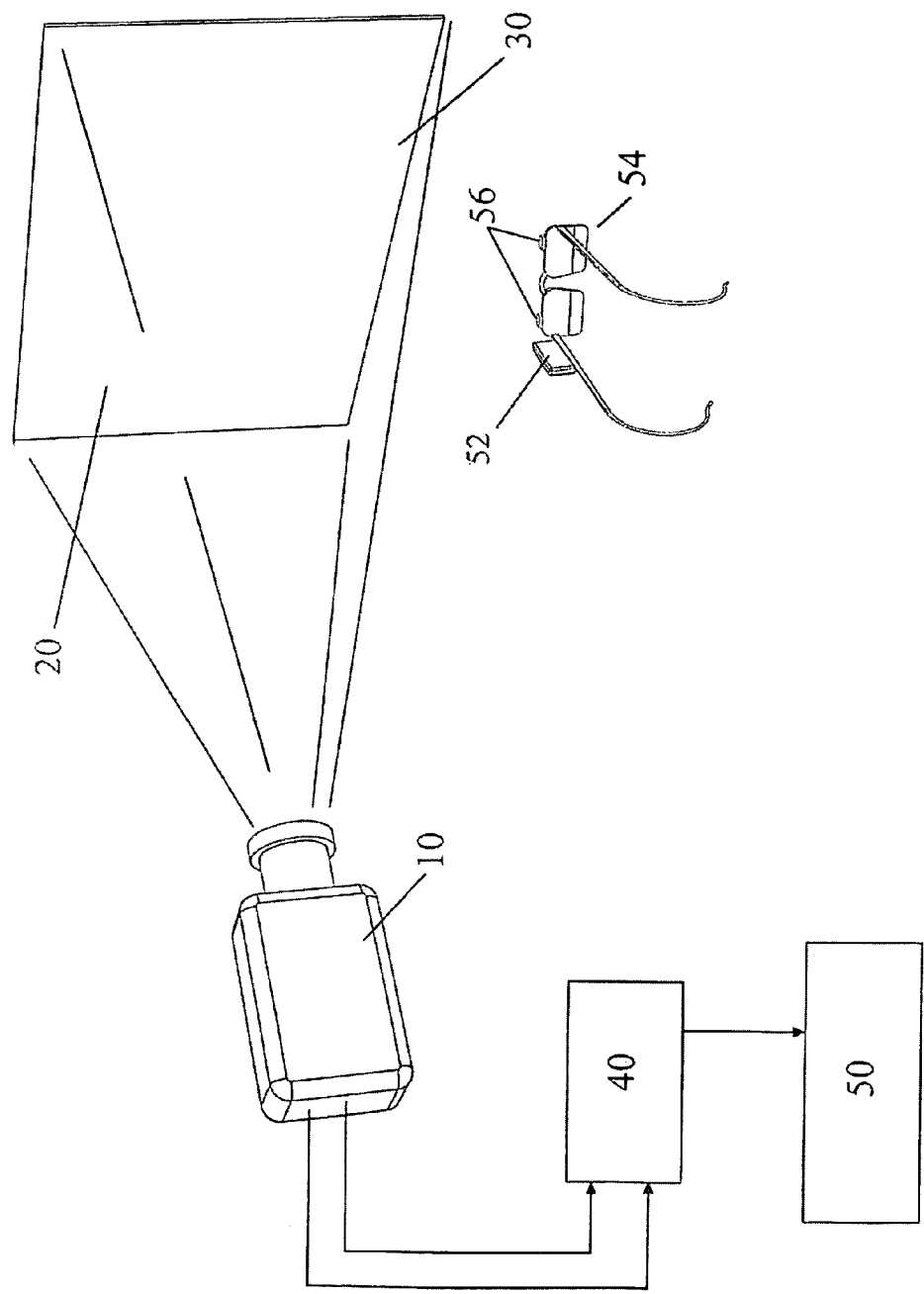
Figure #1

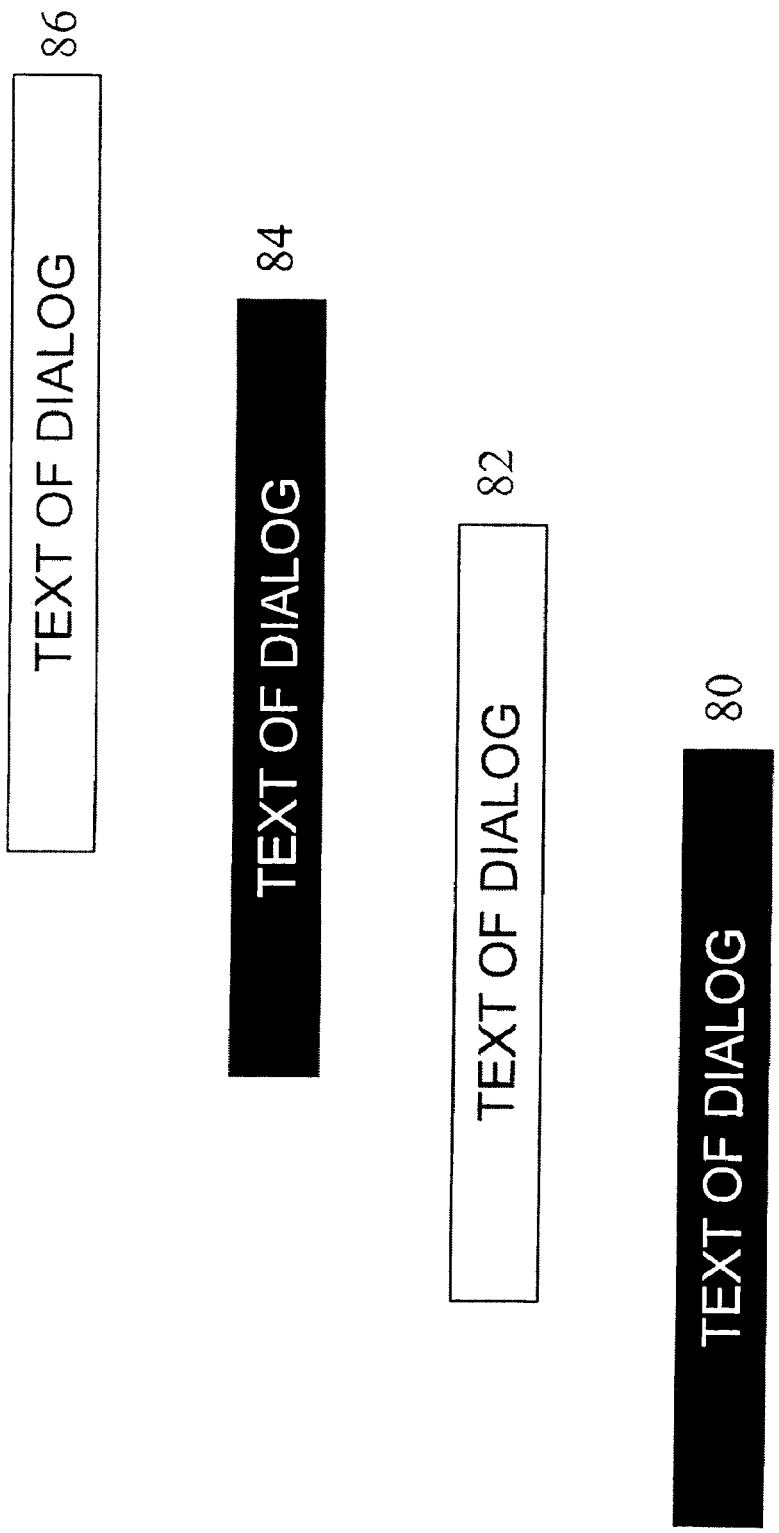
Figure #2

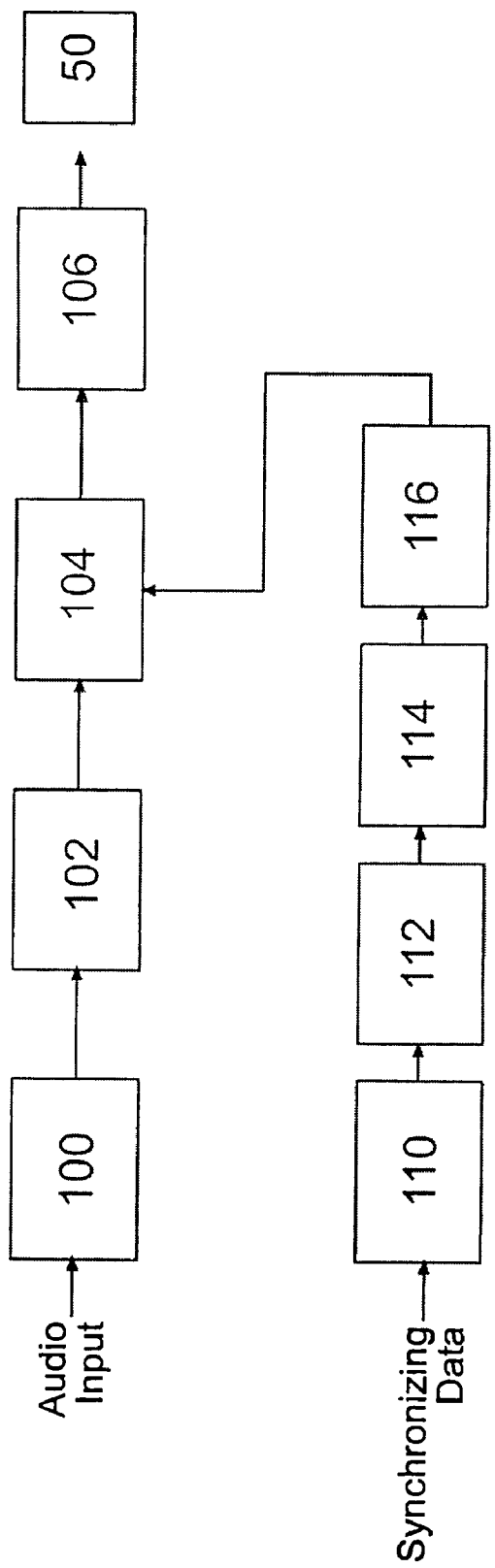
Figure #3

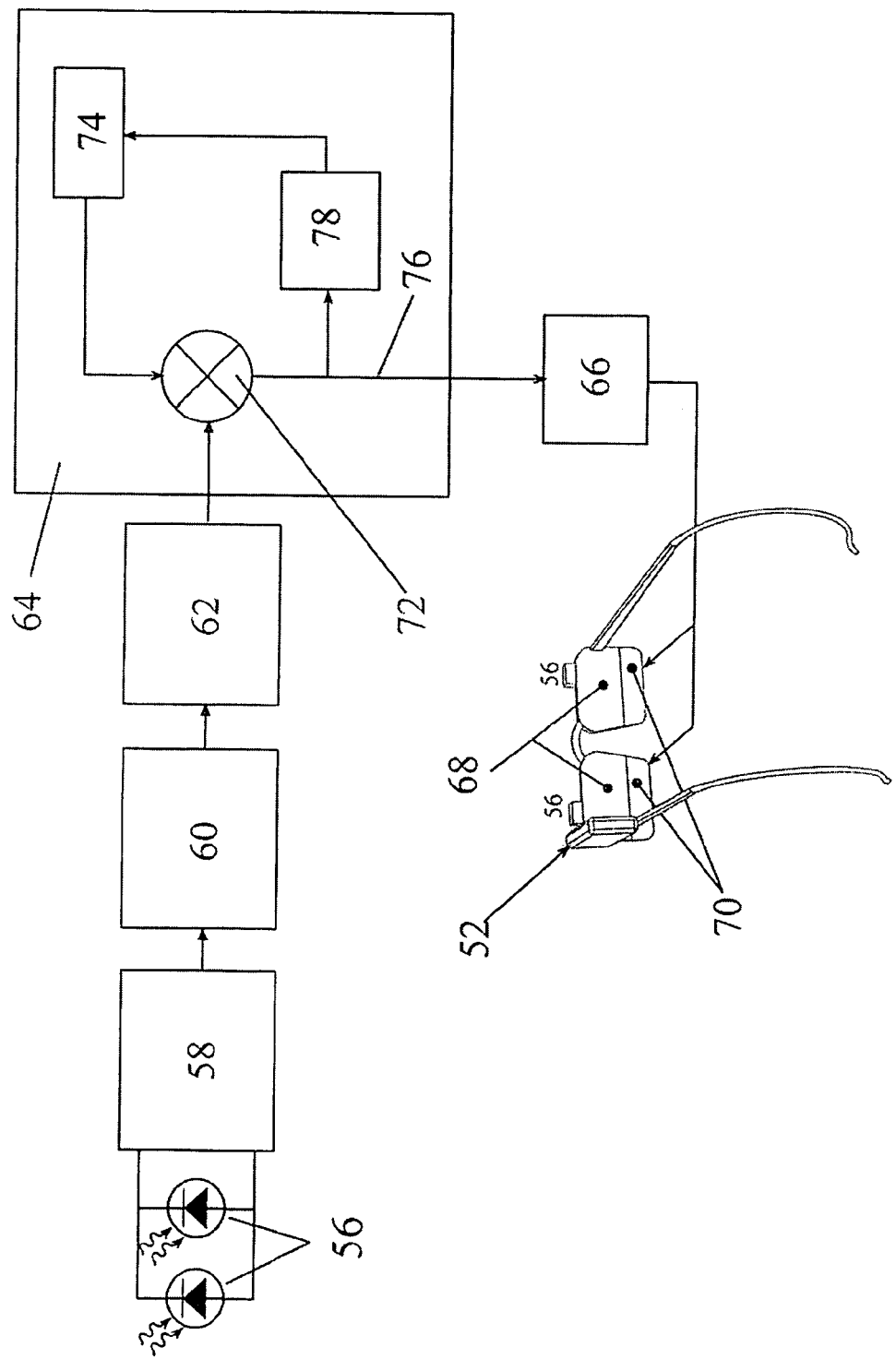
Figure #4

CAPTIONING SYSTEM AND METHOD

FIELD OF THE INVENTION

This invention relates to captioning systems for motion pictures.

BACKGROUND OF THE INVENTION

For many decades, caption text has been provided for foreign language films to provide a translation of the dialog for those not fluent in the language of the film. Usually when it is provided, the caption text normally is printed directly on the film itself so that when the movie is shown, it appears in the lower portion of the image area where it is visible to the entire audience. Since the caption text can be viewed by everyone, it can be very distracting to those that don't need or want to see it in order to understand the dialog. Thus, such text often is considered objectionable to such people.

As a result, a number of prior art devices have been proposed or demonstrated which display caption text in such a manner that it results in minimal to no effect on the portion of the audience not requiring its use. For example, in U.S. Pat. No. 4,859,994 issued to Zola, Zola discloses a liquid crystal display that is placed at the bottom of a movie screen which forms alpha-numeric images in plane-polarized light against a cross-polarized background such that the alpha-numeric captions can be read with the use of polarized glasses. In U.S. Pat. Nos. 6,005,536 and 5,648,789 issued to Beadles, et. al, Beadles et. al. disclose captioning glasses which receive the caption data via a wireless connection and then displays it in the field of view of the user. In U.S. Pat. No. 5,570,944, issued to Seder, Seder discloses a system in which the caption text is displayed on a panel mounted on the rear wall of the theater and the user is given a small reflecting device which reflects the text located on the panel so that it can be seen by the user. In U.S. Pat. No. 4,673,266 issued to Fiumi, Fiumi discloses a system in which the caption text is stored in a memory device which then displays the text on a separate screen near the movie screen in response to signals encoded on the film outside the image area. In U.S. Pat. No. 6,785,539 issued to Hale, Hale discloses a system for wirelessly triggering a portable device by IR or radio transmission where the portable device is pre-programmed with the caption text or an audible version thereof.

The problems with the prior art captioning devices concern the acceptance, economics and the implementation of the captioning system. Acceptance of a particular system depends on the amount it distracts members of the audience who do not need to use the system. The economics and implementation of prior art devices involve the capital outlay required per theater. In some of the prior art devices a new screen, wiring and installation may be required for each theater, in addition to the cost of the individual devices used by the patrons to access the caption text. For example, in the Zola U.S. Pat. No. 4,859,994 system, the installation and cost of a large LCD panel, (perhaps 20 feet by 1½ feet in size), the auxiliary lamp or mirror and the electronics needed might be cost prohibitive. Also, there is the additional cost of the individual polarized glasses for each of the patrons. Likewise, the Seder U.S. Pat. No. 5,570,944 system requires the installation and cost of an additional display unit mounted on the rear wall of each theater, additional wiring, and individual mirror devices for each person using the system.

Thus, since most of these prior art systems involve a very large outlay of capitol to accommodate a very small percent of the theater patrons, they are economically unfeasible. And while the distraction to people sitting nearby would be very minimal for the Zola system, it could be significant for the Seder system.

Thus, the system of the present invention is an improvement over the prior art because it requires minimal permanently mounted equipment for each theater in which is it used so that the capital outlay is nominal. Likewise, the cost of the individual glasses worn by the patrons to capture the text is nominal.

The system of the present invention further is advantageous over prior art devices because it presents caption information to individuals in a movie theater in such a way that the caption text is neither obvious nor distracting to other patrons in the theater. Therefore, the system of the present invention provides the movie theater industry with a low cost system that virtually eliminates distraction to other patrons.

Currently, many theaters currently have an infrared system that provides enhanced audio dialog for those that have an impairment of hearing but are not deaf. This system transmits the dialog via an IR carrier. Earphones worn by the patrons receive the IR and amplify the audio signal. In addition, many theaters currently use or intend to use video projectors containing Digital Light Processors ("DLP") which are silicon based optical modulators that transform a digital signal input into a viewable light image for moving picture presentation. The DLPs do not use film but rather receive and project digital signals from satellites or other feed. The frame rate of current DLP can be as high as one hundred forty four Hertz, which allows the encoding of the text in a manner that uses persistence of vision for masking. The present invention is designed to be used with DLP and the IR signal available in the theater. However, any other digital projector which flashes light at the screen at a very high rate that is undetected by the human eye may be used with an IR or other available signal synchronizing system.

SUMMARY OF THE INVENTION

The present invention is a system and method which provide caption text within the small, dim light strip that is continuously displayed at the bottom of a standard movie. The caption text is encoded in that light strip in such a manner that the normal persistence of vision prevents the ordinary viewer from seeing the text. The light strip will appear to be stationary so that it will not distract the ordinary viewer of the movie.

The caption text is sent as a signal which switches the dim light of the strip on and off at a very high rate. The first and alternate applications of light will show the text as light with a black background. Every second application of light covers the whole strip with the text displayed in black, which is a precise negative of the previous light application. Thus, because the application rate or frame rate is high enough, the persistence of vision of the human eye will merge the two frames to give the appearance of a solid dim panel with no text being displayed. Therefore, the viewers in the audience that need to see the caption text will need to have a pair of "shutter" glasses synchronized to the light signal so that they will block the light for every other light application thereby making the caption text visible to the viewer. Specifically, the shutter glasses will be synchronized with the light applications of the projector by either synchronizing pulses wirelessly transmitted to the glasses via an IR or radio link or by direct optical and photoelectric pickup of light pulses from the screen. Thus, no modification of the DLP projector is required.

In the preferred embodiment of the invention, the glasses will have liquid crystal display, (LCD) lenses, electronics for driving the LCD lenses, receiving electronics, IR sensor photodiodes and a small battery. The lenses of the glasses are clear except for the lower part which would correspond to the shape or form of "bifocals". The bifocal area consists of an LCD, (Liquid Crystal Display), which can pass or block light according to the voltage applied to the layers of the LCD. When viewing the movie, the clear portion of the lens allows a normal view of the movie while the bifocal portion would decode the caption panel and allow the text to be read.

Specifically, DLP projectors receive the movie through an incoming data stream which is controlled by software that is either transmitted with the data stream or which is resident within the memory associated with the projectors. Thus, in the present invention, the formatting and operation of the caption text light strip can be transmitted as part of the software associated with the particular movie or easily programmed into the memory associated with a particular projector.

The invention also makes use of the infrared assistive listening system, mentioned above, to send the synchronizing signal to the glasses. Since the IR signal is flooded throughout the auditorium and carries an fm modulated carrier, it also can be used for transmission of other data, such as the synchronizing signal to the glasses. The system of the present invention also causes no significant degradation of either the audio or the caption data which can occur when multiplexing two independent streams of data on a single carrier especially where one data stream is analog, as is the case with the audio signal.

BRIEF DESCRIPTION OF THE DRAWINGS

FIG. 1 is a block diagram illustrating the preferred embodiment of the captioning system of the present invention.

FIG. 2 is a block diagram illustrating the timing sequence of the text that is being encoded onto the green panel shown in FIG. 1.

FIG. 3 is a block diagram of the multiplexer of the captioning system of the present invention shown in FIG. 1.

FIG. 4 is a block diagram of the electronics contained with the LCD glasses of the captioning system of the present invention.

DETAILED DESCRIPTION OF THE DRAWINGS

Referring first to FIG. 1, a block diagram of the preferred embodiment of the captioning system of the present invention is shown as used in a movie theater. Video projector 10 projects a movie and a dim light panel onto a movie screen 20 having a green panel 30. In the preferred embodiment the video projector 10 is a DLP projector. However, any other projector which flashes light at the screen 20 at a high rate that is undetected by the human eye may be used.

When a DLP projector is used, it receives a movie as an incoming data stream which is controlled by software that is either transmitted with the data stream or which is resident within the memory associated with the projector. The incoming data stream contains audio and visual components. Likewise, the captioning text is transmitted as a data stream as either part of the movie or as a separate signal. In the present invention, the formatting and operation of the caption text either can be transmitted as part of the software associated with the particular movie or easily programmed into the memory associated with a particular projector so that it will be shown in the dim light strip at the bottom of the screen that is present in all movie presentations.

The audio signal that is encoded onto the movie is decoded by electronics (not shown) in the projector and fed into a multiplexer unit 40. A signal for synchronizing the caption text is also fed from the projector 10 into the multiplexer 40. The multiplexer 40 thereafter combines the two audio and the synchronizing signals from the projector as shown in FIG. 3 and feeds them into a standard assistive listening infrared transmitter 50. The infrared transmitter 50 then radiates the multiplexed infrared signal throughout the auditorium where it is received by a receiver 52 (shown in more detail in FIG. 4) that is mounted on or located within one or more pairs of shutter glasses 54. A pair of photodiodes 56 mounted on the rim of the glasses 54 receive the synchronizing signal as part of the IR radiated from the assistive listening transmitter 50.

Referring next to FIGS. 1-4, and more particularly to FIG. 2, the captioning text is transmitted as a signal which switches the dim light of the strip that is present at the bottom of the movie frame on and off at a very high rate. As shown in FIG. 2, which is a sampling of four sequential light applications on green panel 30, the first application 80 is of light captioning text within a black background. The second sequential light application 82 illuminates the panel with a light background in which the captioning text is black which is a precise negative of the previous light application Subsequent light applications 84 and 86 are sequential repeats of applications 80 and 82 such that the background is black and the lettering is light followed by an application wherein the background is light and the lettering is black. Thus, every second application of light covers the whole strip with the text displayed in black. Because the application rate or frame rate is high enough, the persistence of vision of the human eye will merge the two frames to give the appearance of a solid dim panel with no text being displayed.

Referring more particularly to FIG. 3, the interior of the multiplexer 40 is shown in block form. The audio signal received from the projector 10 shown in FIG. 1 is connected to an amplifier 100 which amplifies the signal and passes it to a low pass filter 102. The low pass filter 102 prevents any high audio or transient frequencies from mixing with the FSK carrier.

At the same time as this is occurring, the synchronizing signal received from projector 10 is connected to an amplifier and low pass filter 110. The filter 110 prevents harmonics of the digital data from causing unwanted spurious components in the sub carrier channel. A two level digital signal modulator 112 receives the signal from filter 110 and modulates the sub carrier oscillator 114 which in the preferred embodiment is 20 kHz, so that during the high level portions of the signal the frequency is shifted upward. The lower level causes the frequency to be shifted down below the nominal 20 kHz. Tile sub carrier signal from oscillator 114 is then fed into the input of a bandpass filter 116 which attenuates the sidebands that normally would interfere with the audio signal transmission.

Both the audio output signal from filter 102 and the modulated synchronization signal from filter 116 are then fed to a summing junction 104 where they are linearly added together and then sent to an output amplifier 106 which is connected to the assistive listening transmitter 50 shown in FIG. 1.

In the preferred embodiment, the multiplexer generates a nominal 20 kHz sub carrier which is frequency-shift-keyed, (FSK), with the synchronization data. As a result of the FSK modulation, the frequency of the sub-carrier shifts from, for example. 19 kHz to 21 kHz at the low and high excursions of the digital input. This FSK sub-carrier is then linearly mixed with the audio signal at a low level before it is fed to the assistive listening infrared transmitter.

Referring next to FIG. 4, the electronics and components of the glasses 54 o f the present invention are shown in greater detail. The upper portions 68 of each of the lens of the glasses 54 are clear. The lower portions 70 consist of LCD shutters. Mounted on the rim of glasses 54 are a pair of photodiodes 56. Also mounted on the glasses is a receiver 52.

The glasses allow the movie patron to view the captioning data when the photodiodes 56 pick up the IR radiation from the assistive listening transmitter 50. The photodiodes are connected to a preamplifier 58 which amplifies the FM modulation of the IR signal. The amplified signal is then fed into the FM receiver 60 which in the preferred embodiment is a single chip FM receiver tuned to the FM channel of the assistive listening radiation. The output from the receiver is the audio and the 20 kHz sub carrier signal. These signals are fed into a band-pass filter 62 which then suppresses the audio signal and passes the 20 kHz FSK sub carrier signal into a phase-locked-loop, ("PLL") 64.

The phase-locked-loop allows an oscillator to track or follow the phase and frequency of an incoming signal. In the present invention, the phase locked loop comprises a phase comparator 72 which receives two inputs, one from the band-pass filter 62 and the other from the local 20 kHz oscillator 74. The output of the phase comparator 72 is a voltage proportional to the phase difference between the two signals. The phase difference or error signal 76 is connected to an amplifier and filter 78 which conditions the error signal to control the frequency and phase of the 20 kHz oscillator 74 in such a way that the signal output of the oscillator 74 follows the phase and frequency of the incoming signal precisely. The error signal 76 not only provides the means for the oscillator to follow the incoming phase but it also is a record of the phase and frequency changes of the incoming signal from the band pass filter 62. The incoming signal is the FSK carrier whose frequency changes as a result of the digital modulation of the oscillator 114, shown in FIG. 3. The error signal 76 contains a waveform which faithfully reproduces the digital FSK modulation. That signal is then connected to the driver electronics 66 of the glasses 54 which causes the LCD shutters 70 to pass the encoded caption text.

While particular embodiments and techniques of the present invention have been shown and illustrated herein, it will be understood that many changes, substitutions and modifications may be made by those persons skilled in the art. It will be appreciated from the above description of the presently preferred embodiment and techniques that other configurations and techniques are possible and within the scope of the present invention. Thus, the present invention is not intended to be limited to the particular embodiments and techniques or to the motion picture industry as specifically discussed hereinabove. For example, this invention may be used in any industry or any application in which data is being decoded for viewing by some but not others of the audience. By way of example and not limitation, it is also intended to be used with other projectors not heretofore invented and by other means to transmit synchronized signals other than those disclosed herein.

What is claimed is:

1. A system for providing data information that is visible to certain persons and not visible to others, comprising:

means for projecting a plurality of rapid light applications containing encoded data information at a frequency needed for obscuration by the persistence of vision of the human eye; wherein said light applications alternative between positive and negative images of the same data information;

receiving means which synchronously blocks the light from alternate applications of light, allowing the viewer to see only the positive image or the negative image of the same data information, but not both; whereby the data information is decoded and becomes visible.

2. The system of claim 1 wherein the first and each odd alternate plurality of light applications comprise light text with a dark background and the second and each even alternate light application comprise a light background with dark text, wherein the second and each even alternative light applications being a precise compliment of the first and odd applications.

3. The system of claim 1 wherein the plurality of light applications comprise a predetermined sequence of light text with a dark background followed by a light background with dark text.

4. The system of claim 1 wherein the plurality of light applications comprise a predetermined sequence of dark text with a light background followed by a dark background with light text.

5. The system of claim 1 wherein the receiving means comprises an infrared or radio frequency sensitive device and signal processing means which demodulates the synchronizing signal and causes the viewer to see only the positive image or the negative image of the same data information, but not both.

6. The system of claim 1 wherein the receiving apparatus comprises a pair of glasses, an infrared or radio frequency sensitive device, signal processing means and shutter devices in the lower portion of the lenses which open and close in response to the synchronizing signal.

* * * * *